(12) United States Patent
Van Atta

(10) Patent No.: US 7,147,321 B2
(45) Date of Patent: Dec. 12, 2006

(54) EYEWEAR WITH NOSEPIECE

(75) Inventor: Dylan S. Van Atta, Portland, OR (US)

(73) Assignee: Nike, Inc., Beaverton, OR (US)

( * ) Notice: Subject to any disclaimer, the term of this patent is extended or adjusted under 35 U.S.C. 154(b) by 0 days.

(21) Appl. No.: 11/122,150

(22) Filed: May 4, 2005

(65) Prior Publication Data

US 2006/0250573 A1 Nov. 9, 2006

(51) Int. Cl.
*G02C 5/12* (2006.01)

(52) U.S. Cl. ........................ 351/136; 351/139

(58) Field of Classification Search ........ 351/136–139, 351/78–82
See application file for complete search history.

(56) References Cited

U.S. PATENT DOCUMENTS

| | | | |
|---|---|---|---|
| 2,362,725 A | 11/1944 | Slotsky | 351/60 |
| 2,397,243 A | 3/1946 | Cooper, Jr. | 2/436 |
| 2,444,498 A | 7/1948 | Cochran | 2/443 |
| D150,924 S | 9/1948 | Bright | D16/315 |
| 2,534,655 A | 12/1950 | Baratelli | 351/41 |
| 2,563,125 A | 8/1951 | Malcolm, Jr. | 2/450 |
| 2,571,704 A | 10/1951 | Gilden | 351/106 |
| 2,607,919 A | 8/1952 | Stegeman | 2/443 |
| 2,770,806 A | 11/1956 | Moeller | 2/12 |
| 2,825,267 A | 3/1958 | Gagnon | 351/52 |
| D182,459 S | 4/1958 | Eisler | D16/316 |
| 3,066,573 A | 12/1962 | Moeller | 351/60 |
| 3,233,249 A | 2/1966 | Baratelli et al. | 2/443 |
| 3,517,393 A | 6/1970 | Beauchef | 2/436 |
| 3,756,704 A | 9/1973 | Marks | 351/60 |
| 3,838,914 A | 10/1974 | Fernandez | 351/106 |
| 4,317,240 A | 3/1982 | Angerman et al. | 2/436 |
| 4,674,851 A | 6/1987 | Jannard | 351/47 |
| D293,450 S | 12/1987 | Jannard | D16/102 |
| 4,730,915 A | 3/1988 | Jannard | 351/47 |
| 4,824,233 A | 4/1989 | Jannard | 351/47 |
| 4,951,322 A | 8/1990 | Lin | 2/439 |
| D324,394 S | 3/1992 | Jannard | D16/102 |
| 5,249,001 A | 9/1993 | Jannard | 351/123 |
| 5,387,949 A | 2/1995 | Tackles | 2/436 |
| 5,467,148 A | 11/1995 | Conway | 351/85 |
| 5,555,037 A | 9/1996 | Canavan | 351/118 |
| 5,576,775 A | 11/1996 | Bolle | 351/62 |
| 5,581,312 A | 12/1996 | Chen | 351/138 |
| 5,841,505 A | 11/1998 | Bolle' | 351/44 |
| 6,196,681 B1 | 3/2001 | Canavan | 351/106 |
| 6,367,927 B1 | 4/2002 | Yang | 351/103 |
| 6,386,705 B1 | 5/2002 | Chen | 351/138 |
| 6,422,699 B1 * | 7/2002 | Kobayashi | 351/136 |
| 6,517,202 B1 | 2/2003 | Huang | 351/103 |
| 6,991,333 B1 * | 1/2006 | Van Atta et al. | 351/62 |

FOREIGN PATENT DOCUMENTS

WO WO 00/36453 6/2000

* cited by examiner

*Primary Examiner*—Huy Mai
(74) *Attorney, Agent, or Firm*—Banner & Witcoff, Ltd

(57) ABSTRACT

Eyewear includes a lens with front and rear surfaces, a peripheral edge surface, and a recess. First and second notches are formed in the recess. A nosepiece is secured to the lens and includes a core member having first and second ends and a substantially V-shaped body. An outer member substantially encases the elongate member, with the outer and core members having substantially V-shaped bodies. A first end fitting is connected to the first end of the core member, and is received by the first notch. A second end fitting is connected to the second end of the core member, is received by the second notch.

46 Claims, 3 Drawing Sheets

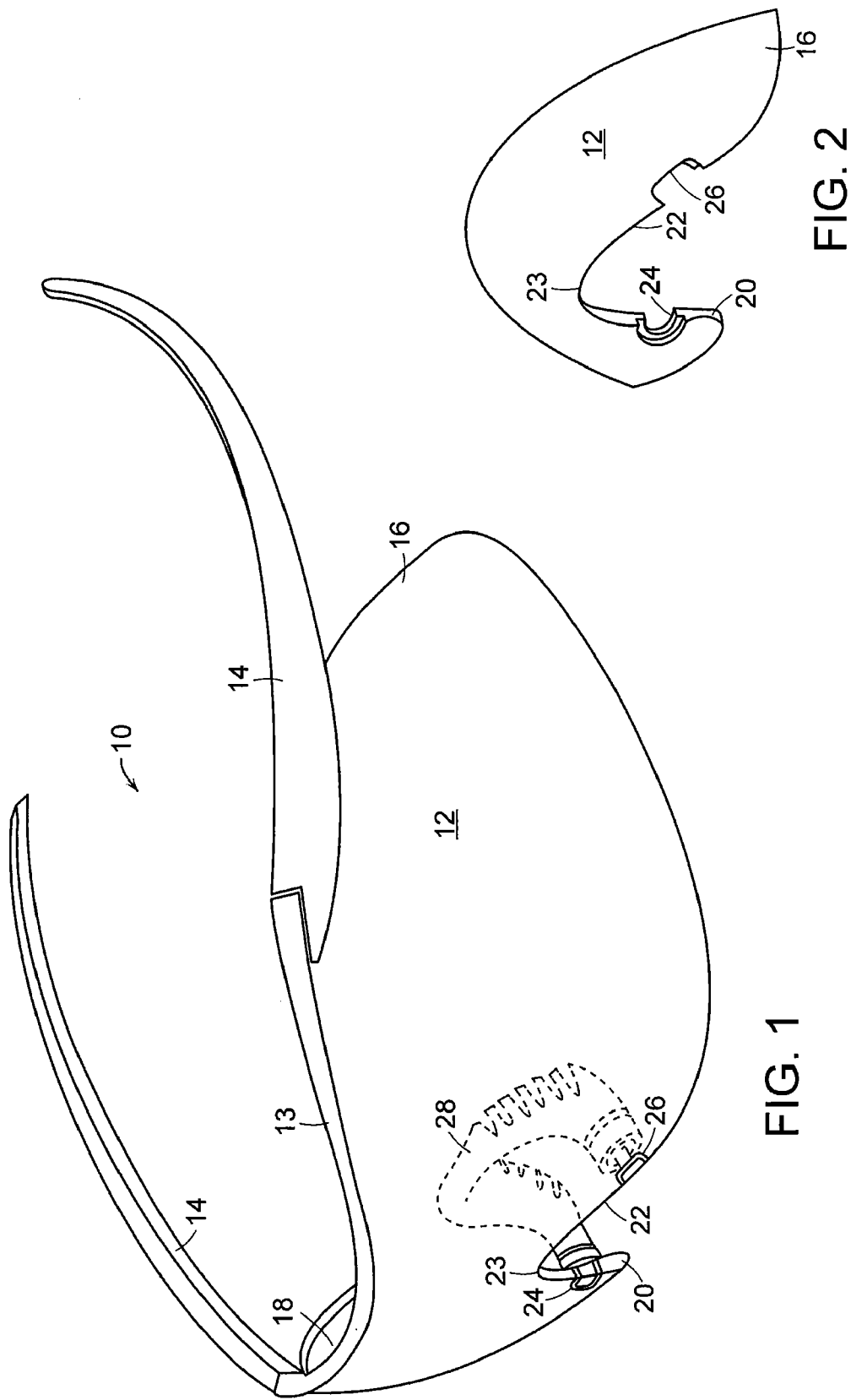

EYEWEAR WITH NOSEPIECE

FIELD OF THE INVENTION

This invention relates generally to eyewear, and, in particular, to eyewear having an adjustable nosepiece.

BACKGROUND OF THE INVENTION

Eyewear typically has a nosepiece that is formed as part of the frame or is secured directly to the lens. Eyewear that incorporates a wraparound lens, commonly referred to as a shield lens, is well known in the art. Eyewear with a wraparound lens is often used by individuals when they are engaged in athletic activities, such as biking, skiing, and running. A problem common with eyewear, such as eyewear with a shield lens, for example, is that the nosepiece is not adjustable. An additional problem is that such eyewear can fog up due to the heat and perspiration generated by the user during athletic activities.

It is an object of the present invention to provide eyewear having an adjustable nosepiece that reduces or overcomes some or all of the difficulties inherent in prior known devices. Particular objects and advantages of the invention will be apparent to those skilled in the art, that is, those who are knowledgeable or experienced in this field of technology, in view of the following disclosure of the invention and detailed description of certain embodiments.

SUMMARY

The principles of the invention may be used to advantage to provide embodiments of eyewear having an adjustable nosepiece that is flush with a front surface of the lens and that is replaceable. In accordance with a first aspect, eyewear includes a lens having a front surface, a rear surface, a peripheral edge surface, a recess formed in a lower central portion of the lens, a first notch formed in the recess, and a second notch formed in the recess. A nosepiece is secured to the lens and includes a core member having a first end, a second end, and a substantially V-shaped body. An outer member substantially encases the core member and has a substantially V-shaped body. A first end fitting is connected to the first end of the core member and is received by the first notch. A second end fitting is connected to the second end of the core member and is received by the second notch.

In accordance with another aspect, eyewear includes a lens having a front surface, a rear surface, a peripheral edge surface, a first notch formed therein, and a second notch formed therein. A pair of temple arms is secured to the lens. A nosepiece is secured to the lens and includes a core member having a first end and a second end and a substantially V-shaped body with a closed end of the body being substantially rounded. An outer member substantially encases the elongate member and has a substantially V-shaped body with a closed end of the body being substantially rounded. A first end fitting is connected to the first end of the core member and is received by the first notch, the first end fitting being substantially flush with the front surface and the peripheral edge surface of the lens. A second end fitting is connected to the second end of the core member and is received by the second notch; the second end fitting being substantially flush with the front surface and the peripheral edge surface of the lens.

In accordance with a further aspect, eyewear includes a lens having a front surface, a rear surface, a peripheral edge surface, a substantially V-shaped recess in a lower central portion of the lens with a closed end of the V shape being substantially rounded, a first notch formed in one side of the recess, and a second notch formed in an opposed second side of the recess. A pair of temple arms is secured to the lens. A nosepiece is secured to the lens and includes a core member having a first end and a second end and a substantially V-shaped body with a closed end of the body being substantially rounded. An outer member substantially encases the elongate member and has a substantially V-shaped body with a closed end of the body being substantially rounded. A first end fitting is connected to the first end of the core member and is received by the first notch, with the first end fitting being substantially flush with the front surface and the peripheral edge surface of the lens. A second end fitting is connected to the second end of the core member and is received by the second notch, with the second end fitting being substantially flush with the front surface and the peripheral edge surface of the lens.

In accordance with yet a further aspect, eyewear includes a first lens having a front surface, a rear surface, a peripheral edge surface, and a notch formed in the recess. A second lens has a front surface, a rear surface, a peripheral edge surface, and a notch formed in the recess. A nosepiece is secured to the first and second lenses and includes a core member having a first end, a second end, and a substantially V-shaped body. An outer member substantially encases the core member and has a substantially V-shaped body. A first end fitting is connected to the first end of the core member and is received by the notch in the first lens. A second end fitting is connected to the second end of the core member and is received by the notch in the second lens.

In accordance with yet another aspect, a nosepiece for eyewear includes a core member having a first end, a second end, and a substantially V-shaped body. An outer member substantially encases the core member and has a substantially V-shaped body. A first end fitting is connected to the first end of the core member. A second end fitting is connected to the second end of the core member.

Substantial advantage is achieved by providing eyewear with an adjustable nosepiece. In particular, certain embodiments provide adjustability for the user, providing improved fit and comfort. Other advantages include an improved aesthetic appearance, the ability to replace the nosepiece with another nosepiece, and improved ventilation.

These and additional features and advantages disclosed here will be further understood from the following detailed disclosure of certain embodiments.

BRIEF DESCRIPTION OF THE DRAWINGS

FIG. 1 is a perspective view of an article of eyewear in accordance with a various embodiments.

FIG. 2 is a perspective view of a core member of the nosepiece of the eyewear of FIG. 1.

Figure 4:
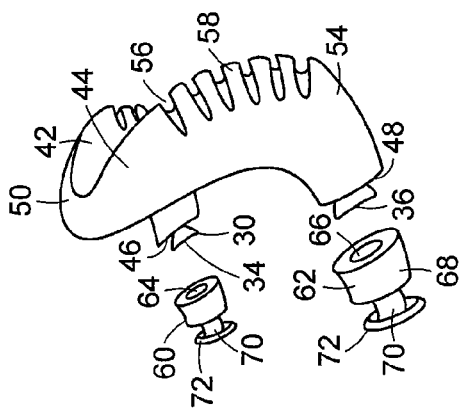
FIG. 4 is a perspective view, shown partially exploded, of the nosepiece of FIG. 3.

The figures referred to above are not drawn necessarily to scale and should be understood to provide a representation of the invention, illustrative of the principles involved. Some features of the eyewear depicted in the drawings have been enlarged or distorted relative to others to facilitate explanation and understanding. The same reference numbers are used in the drawings for similar or identical components and features shown in various alternative embodiments. Eyewear as disclosed herein would have configurations and components determined, in part, by the intended application and environment in which they are used.

DETAILED DESCRIPTION OF CERTAIN PREFERRED EMBODIMENTS

The present invention may be embodied in various forms. An embodiment of eyewear 10 is shown in FIG. 1. In certain embodiments, eyewear 10 is sunglasses. In particular, the embodiments depicted herein illustrate performance sunglasses, commonly referred to as shield eyewear, which include a single lens and are often used by bicycle riders and runners. However, it is to be appreciated that eyewear 10 is meant to include all types of glasses, including glasses having two separate lenses. Other eyewear suitable for use include, for example, prescription glasses and safety glasses with clear lenses.

Certain directional terms used herein refer to directions with respect to the wearer of eyewear 10. Thus, the terms outward, outwardly, forward, and forwardly, as used herein, refer to a surface facing away from, or a direction extending away from, the face of a wearer of eyewear 10. The terms inward, inwardly, rear, and rearwardly refer to a surface facing toward, or a direction extending toward, the face of a wearer of eyewear 10.

Eyewear 10 includes a lens 12, a frame 13 to which an upper edge of lens 12 is secured, and a pair of temple arms 14 at opposed ends of frame 13. Temple arms 14 may be secured to frame 13, or to both frame 13 and lens 12. Temple arms 14 may pivot with respect to lens 12 and frame 13, or they may be fixed with respect to lens 12 and frame 13.

Temple arms 14 and frame 13 may be formed of any suitable material, including, for example, plastic, or a rubber coated core material, such as metal or plastic. In certain embodiments, temple arms 14 and frame 13 are formed of a flexible, resilient material, such as beta titanium. In other embodiments, temple arms 14 and frame 13 may be formed of a rigid material, such as a fiber-reinforced material, e.g., a carbon fiber composite. Other suitable materials for temple arms 14 and frame 13 will become readily apparent to those skilled in the art, given the benefit of this disclosure.

Lens 12 includes an outer surface 16, an inner surface 18, and a peripheral edge surface 20. An inverted substantially V shaped recess 22 is formed in a lower central portion of lens 12, seen most clearly in FIG. 2. A closed end 23 of recess 22 is substantially rounded. A first notch 24 is formed on one side of recess 22 and a second notch 26 is formed on an opposed side of recess 22.

Figure 5:
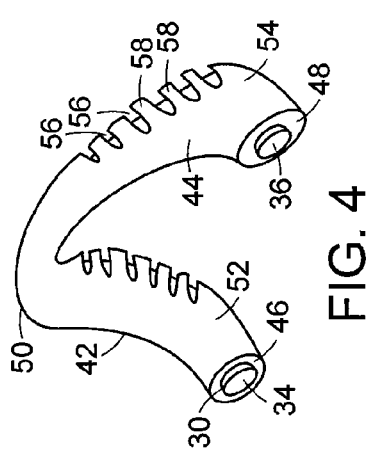
FIG. 5 is a perspective view, shown in exploded form, illustrating the attachment of the nosepiece to the eyewear of FIG. 1.
Figure 3:
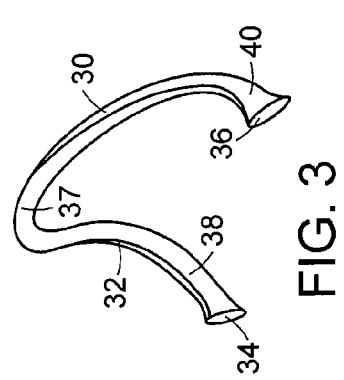
FIG. 3 is a perspective view of the nosepiece of the eyewear of FIG. 1.

A nosepiece 28 is secured to lens 12 in recess 22. Nosepiece 28, elements of which are seen in FIGS. 3–5, includes a core member 30. Core member 30 has a substantially V-shaped body 32 with a first end 34 and a second end 36. A closed end 37 of substantially V-shaped body 32 is substantially rounded. A first end portion 38 and a second end portion 40 of core member 30 extend substantially perpendicular to substantially V-shaped body 32.

Core member 30, seen in FIG. 3, is formed of a material that is hand bendable, that is, it can be bent to a new shape or configuration by a user by hand without the use of any tools. Core member 30 may be formed of metal such as nickel silver, steel, or monel. Providing core member 30 of a material that is hand bendable allows a user to mold nosepiece 28 to a desired configuration to fit their nose most comfortably. In various embodiments, body 32 is swaged to a flattened configuration, while closed end 37 remains substantially circular in cross-section. First end 34 and second end 36 flare outwardly from the swaged flattened portion of body 32. The swaged flattened configuration of body 23 ensures that nosepiece 28 will not spin about core member 30. Additionally, the swaged wire body can flex more in certain areas, and certain directions, as desired. In certain embodiments, body 32 is swaged in the area of nose contact, and oriented to mate with the shape of the nose of the user.

Core member 30 is encased in an outer member 42 having a substantially V-shaped body 44. First end 34 of core member 30 extends outwardly from a first end 46 of outer member 42. Second end 36 of core member 30 extends outwardly from a second end 48 of outer member 42. A closed end 50 of substantially V-shaped body 44 of outer member 42 is substantially rounded. A first end portion 52 and a second end portion 54 of outer member 42 extend substantially perpendicular to substantially V-shaped body 44. In various embodiments, outer member 42 is formed of a resilient material such as an elastomer. Suitable materials for outer member 42 include rubber, thermoplastic urethane (TPU), and hydrophilic materials (e.g., Megol™, available from Smith Sport Optics, Inc., of Ketchum, Id.). In certain embodiments, outer member 42 may be overmolded around core member 30.

A plurality of grooves 56 are formed in a rear surface of outer member 42, defining inwardly extending fins 58. Fins 58 and grooves 56 serve to provide ventilation for the user and improve the grip and comfort of nosepiece 28 on the user's nose.

As seen in FIG. 5, a first end fitting 60 is secured to first end 46 of outer member 42, and a second end fitting 62 is secured to second end 48 of outer member 42. First end fitting 60 includes an aperture 64 that receives first end 34 of core member 30, and second end fitting 62 includes an aperture 66 that receives second end 36 of core member 30. In various embodiments, adhesive is used to more safely secure first end fitting 60 and second end fitting 62 to core member 30 and outer member 42.

Figure 6:
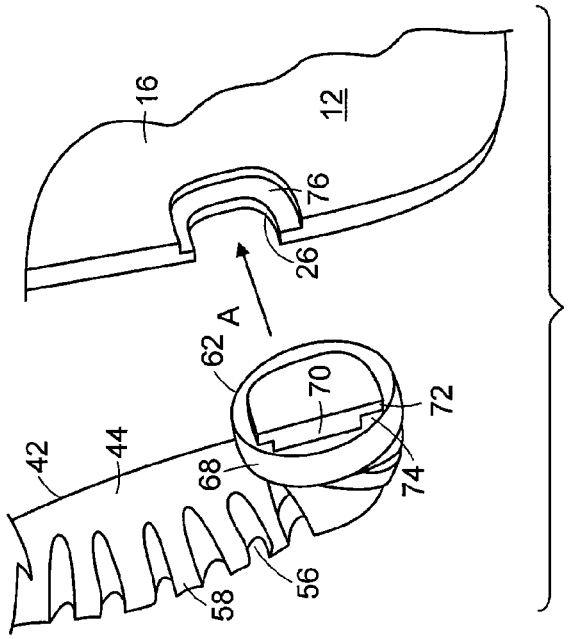
FIG. 6 is a perspective view, shown in exploded form, illustrating the attachment of the nosepiece to the lens of the eyewear of FIG. 1.

Second end fitting 62 is seen in greater detail in FIG. 6. Second end fitting 62 includes a base portion 68 and a projection 70 extending outwardly from base portion 68. Projection 70 is substantially D shaped with a flange 72 extending out from the curved portion of its D shape, defining a groove 74 between flange 72 and base portion 68. Second notch 26 is substantially C shaped, with a recess 76 formed about its periphery in outer surface 16 of lens 12 and shaped to receive flange 72. Second end fitting 62 is received in second notch 26 in snap-fit manner in the direction indicated by the arrow A. It is to be appreciated that projection 70 of second end fitting 62, second notch 26, and recess 76 may have other shapes and that the D and C shapes illustrated here is merely exemplary.

Figure 7:
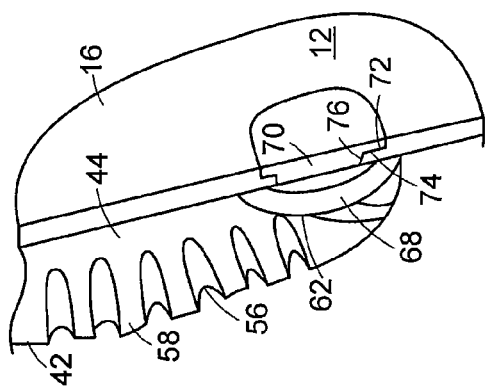
FIG. 7 is a perspective view of a portion of the nosepiece attached to the lens of the eyewear of FIG. 1.

As can be seen in FIG. 7, when second end fitting 62 is fitted into second notch 26, projection 70 of second end fitting 62 is substantially flush with outer surface 16 and peripheral edge surface 20 of lens 12. Thus, eyewear 10 is provided with an aesthetically pleasing and aerodynamic configuration.

It is to be appreciated that first end fitting 60 and second notch 26 have shapes that mirror those of first end fitting 60 and second notch 26 and, therefore, need not be discussed in detail here.

Figure 8:
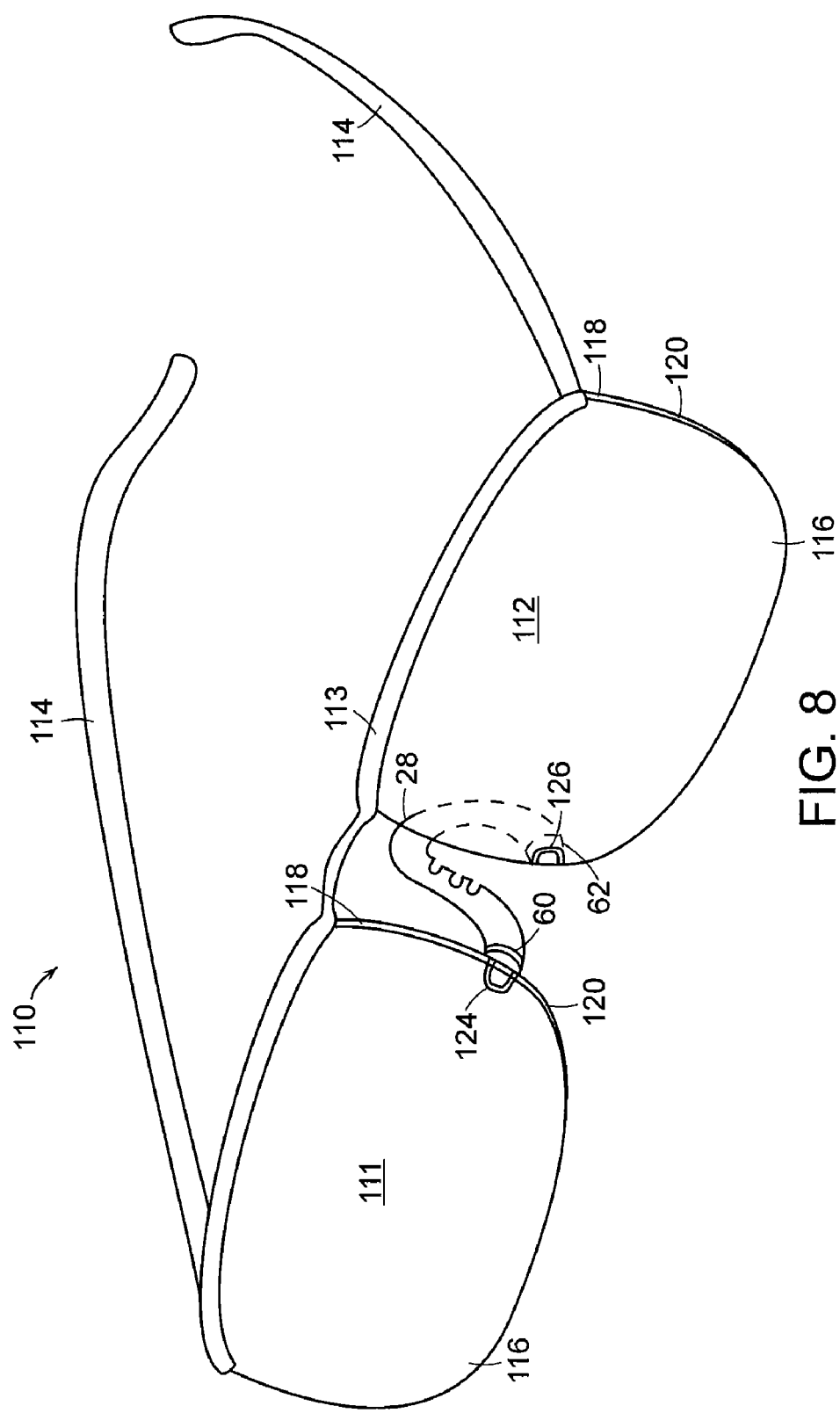
FIG. 8 is a perspective view of another embodiment of eyewear.

In certain embodiments, as shown in FIG. 8, eyewear 110 includes a first lens 111, a second lens 112, a frame 113 to which lenses 111, 112 are secured, and a pair of temple arms 114 at opposed ends of frame 113.

Each of first lens 111 and second lens 112 includes an outer surface 116, an inner surface 118, and a peripheral edge surface 120. A first notch 124 is formed on one side of first lens 111 and a second notch 126 is formed on one side of second lens 112 facing first lens 111.

A nosepiece 28 is secured to first lens 111 and second lens 112 by way of first and second notches 124, 126. Nosepiece 28, elements of which are seen in FIGS. 3–5, includes a core member 30. Core member 30 has a substantially V-shaped body 32 with a first end 34 and a second end 36. A closed end 37 of substantially V-shaped body 32 is substantially rounded. A first end portion 38 and a second end portion 40 of core member 30 extend substantially perpendicular to substantially V-shaped body 32.

As described above with respect to FIGS. 1, 2, 6, 7, first end fitting 60 of nosepiece 28 engages with first notch 124 of first lens 111 and second end fitting 62 of nosepiece 28 engages second notch 126 of second lens 112.

In light of the foregoing disclosure of the invention and description of various embodiments, those skilled in this area of technology will readily understand that various modifications and adaptations can be made without departing from the scope and spirit of the invention. All such modifications and adaptations are intended to be covered by the following claims.

What is claimed is:

1. Eyewear comprising, in combination:
   a lens having a front surface, a rear surface, a peripheral edge surface, a recess formed in a lower central portion of the lens, a first notch formed in the recess, and a second notch formed in the recess; and
   a nosepiece secured to the lens and comprising:
      a core member having a first end, a second end, and a substantially V-shaped body;
      an outer member substantially encasing the core member and having a substantially V-shaped body;
      a first end fitting connected to the first end of the core member and received by the first notch; and
      a second end fitting connected to the second end of the core member and received by the second notch.

2. The eyewear of claim 1, wherein each of the first end fitting and the second end fitting includes a base portion, a projection extending from the base portion and a flange on a periphery of the projection, and each of the first notch and the second notch includes a recess, with each recess receiving a corresponding flange.

3. The eyewear of claim 2, wherein each projection and each flange is substantially D-shaped.

4. The eyewear of claim 2, wherein the first notch and the second notch are substantially C-shaped.

5. The eyewear of claim 1, wherein the core member comprises a length of wire.

6. The eyewear of claim 5, wherein a substantial portion of the wire is swaged.

7. The eyewear of claim 1, wherein first and second end portions of the core member extend substantially perpendicular to the V-shaped body of the core member.

8. The eyewear of claim 1, wherein first and second end portions of the outer member extend substantially perpendicular to the V-shaped body of the outer member.

9. The eyewear of claim 1, wherein the first end of the core member is received in snap-fit fashion in the first notch, and the second end of the core member is received in snap-fit fashion in the second notch.

10. The eyewear of claim 1, wherein the outer member comprises a polymer.

11. The eyewear of claim 1, wherein the outer member includes a plurality of grooves defining a plurality of fins.

12. The eyewear of claim 1, wherein the first end fitting includes a first aperture, the first end of the core member being received in the first aperture, and the second end fitting includes a second aperture, the second end of the core member being received in the second aperture.

13. The eyewear of claim 1 wherein the first and second end fittings are secured to the outer member with adhesive.

14. The eyewear of claim 1, wherein the core member is hand-bendable.

15. The eyewear of claim 1, wherein the recess in the lower central portion of the lens has the shape of an inverted V with a closed end of the V shape being substantially rounded.

16. The eyewear of claim 1, wherein a closed end of the V-shaped body of the core member is substantially rounded.

17. The eyewear of claim 1, wherein a closed end of the V-shaped body of the outer member is substantially rounded.

18. The eyewear of claim 1, wherein the first end fitting is substantially flush with the front surface and the peripheral edge surface of the lens.

19. The eyewear of claim 1, wherein the second end fitting is substantially flush with the front surface and the peripheral edge surface of the lens.

20. Eyewear comprising, in combination:
    a lens having a front surface, a rear surface, a peripheral edge surface, a first notch formed therein, and a second notch formed therein;
    a pair of temple arms secured to the lens; and
    a nosepiece secured to the lens and comprising:
       a core member having a first end and a second end and a substantially V-shaped body with a closed end of the body being substantially rounded;
       an outer member substantially encasing the elongate member and having a substantially V-shaped body with a closed end of the body being substantially rounded;
       a first end fitting connected to the first end of the core member and received by the first notch, the first end fitting being substantially flush with the front surface and the peripheral edge surface of the lens; and
       a second end fitting connected to the second end of the core member and received by the second notch; the second end fitting being substantially flush with the front surface and the peripheral edge surface of the lens.

21. The eyewear of claim 20, further comprising a recess formed in a lower central portion of the lens, the first notch formed in a first side of the recess and the second notch formed in an opposed second side of the recess.

22. The eyewear of claim 21, wherein the recess is an inverted substantially V-shaped recess with a closed end of the V shape being substantially rounded.

23. The eyewear of claim 20, wherein each of the first end fitting and the second end fitting includes a base portion, a projection extending from the base portion and a flange on a periphery of the projection, and each of the first notch and the second notch includes a recess, with each recess receiving a corresponding flange.

24. The eyewear of claim 23, wherein each projection and each flange is substantially D-shaped.

25. The eyewear of claim 23, wherein the first notch and the second notch are substantially C-shaped.

26. The eyewear of claim 20, wherein the core member comprises a length of wire.

27. The eyewear of claim 26, wherein a substantial portion of the wire is swaged.

28. The eyewear of claim 20, wherein first and second end portions of the core member extend substantially perpendicular to the V-shaped body of the core member.

29. The eyewear of claim 20, wherein first and second end portions of the outer member extend substantially perpendicular to the V-shaped body of the outer member.

30. The eyewear of claim 20, wherein the first end of the core member is received in snap-fit fashion in the first notch, and the second end of the core member is received in snap-fit fashion in the second notch.

31. The eyewear of claim 20, wherein the outer member comprises a polymer.

32. The eyewear of claim 20, wherein the outer member includes a plurality of grooves defining a plurality of fins.

33. The eyewear of claim 20, wherein the first end fitting includes a first aperture, the first end of the core member being received in the first aperture, and the second end fitting includes a second aperture, the second end of the core member being received in the second aperture.

34. The eyewear of claim 20, wherein the first and second end fittings are secured to the outer member with adhesive.

35. The eyewear of claim 20, wherein the core member is hand-bendable.

36. The eyewear of claim 20, wherein the recess in the lower central portion of the lens has the shape of an inverted V with a closed end of the V shape being substantially rounded.

37. The eyewear of claim 20, wherein a closed end of the V-shaped body of the core member is substantially rounded.

38. The eyewear of claim 20, wherein a closed end of the V-shaped body of the outer member is substantially rounded.

39. Eyewear comprising, in combination:
   a lens having a front surface, a rear surface, a peripheral edge surface, a substantially V-shaped recess in a lower central portion of the lens with a closed end of the V shape being substantially rounded, a first notch formed in one side of the recess, and a second notch formed in an opposed second side of the recess;
   a pair of temple arms secured to the lens; and
   a nosepiece secured to the lens and comprising:
      a core member having a first end and a second end and a substantially V-shaped body with a closed end of the body being substantially rounded;
      an outer member substantially encasing the elongate member and having a substantially V-shaped body with a closed end of the body being substantially rounded;
      a first end fitting connected to the first end of the core member and received by the first notch, the first end fitting being substantially flush with the front surface and the peripheral edge surface of the lens; and
      a second end fitting connected to the second end of the core member and received by the second notch, the second end fitting being substantially flush with the front surface and the peripheral edge surface of the lens.

40. Eyewear comprising, in combination:
   a first lens having a front surface, a rear surface, a peripheral edge surface, and a notch formed in the recess; and
   a second lens having a front surface, a rear surface, a peripheral edge surface, and a notch formed in the recess; and
   a nosepiece secured to the first and second lenses and comprising:
      a core member having a first end, a second end, and a substantially V-shaped body;
      an outer member substantially encasing the core member and having a substantially V-shaped body;
      a first end fitting connected to the first end of the core member and received by the notch in the first lens; and
      a second end fitting connected to the second end of the core member and received by the notch in the second lens.

41. The eyewear of claim 40, wherein the core member is hand-bendable.

42. The eyewear of claim 40, wherein the outer member includes a plurality of grooves defining a plurality of fins.

43. A nosepiece for eyewear comprising, in combination:
   a core member having a first end, a second end, and a substantially V-shaped body;
   an outer member substantially encasing the core member and having a substantially V-shaped body;
   a first end fitting connected to the first end of the core member; and
   a second end fitting connected to the second end of the core member.

44. The nosepiece of claim 43, wherein the core member is hand-bendable.

45. The nosepiece of claim 43, wherein the outer member includes a plurality of grooves defining a plurality of fins.

46. The nosepiece of claim 43, further comprising eyewear, the first and second end fittings being secured to the eyewear.

* * * * *